Oct. 31, 1939.  D. D. WALLER ET AL  2,177,966
ELECTRICAL REMOTE CONTROL DRIVE
Filed Jan. 27, 1937   2 Sheets-Sheet 1

Inventors
Donald D. Waller,
Lucian B. Smith,
Donald W. Randolph &
Ralph O. Helgeby
By Blackmore, Spencer & Flint
Attorneys

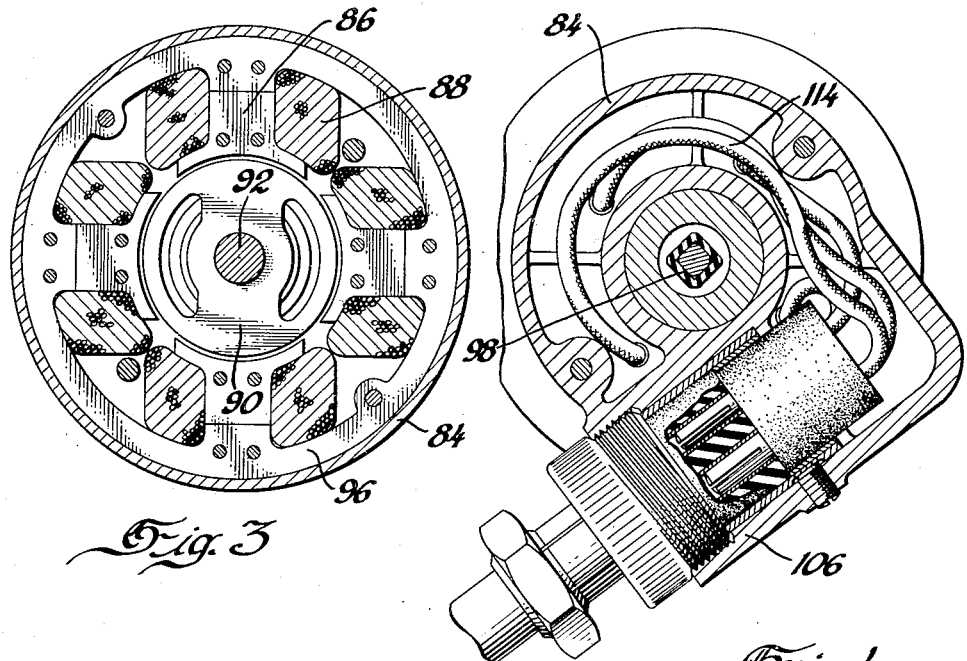
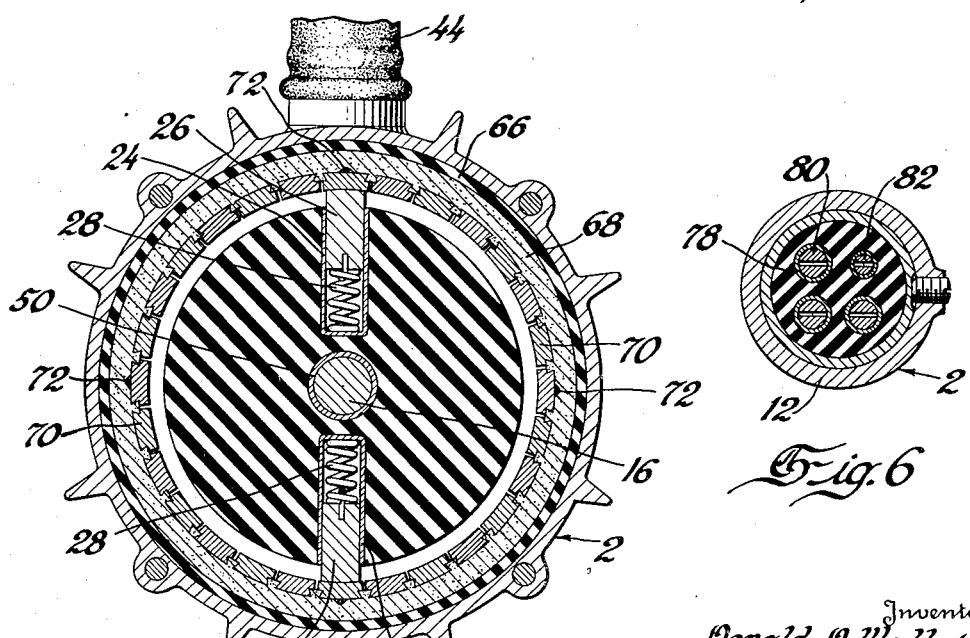

Patented Oct. 31, 1939

2,177,966

UNITED STATES PATENT OFFICE 2,177,966

ELECTRICAL REMOTE CONTROL DRIVE

Donald D. Waller, Lucian B. Smith, Donald W. Randolph, and Ralph O. Helgeby, Flint, Mich., assignors to General Motors Corporation, Detroit, Mich., a corporation of Delaware Application January 27, 1937, Serial No. 122,656

2 Claims. (Cl. 201—55)

This invention relates to remotely operated apparatus in synchronism with proximate apparatus for indicating purposes and more specifically to a synchronously operating drive at a remote point operated from local rotating mechanism, said drive adapted to operate a speed indicator, odometer, tachometer or some other similar instrument to indicate at a remote station the condition of the rotating apparatus.

There are of course many instances in which it is necessary to read at points remote from operating apparatus various operating characteristics such as speed of rotation, number of revolutions, etc. In speedometers for automobiles it is impractical to have the speedometer and odometer adjacent some rotating part but the same is located upon the instrument panel where it can be readily seen by the operator and is driven by some extended electric or mechanical means from the rotating part.

Electrically driven instruments of this type are of course the most practical as the interconnecting means is merely by electrical cable, the length of which and its contour is practically immaterial. Previously, however, this general type of instrument has had the drawback that it does not have sufficient power to propel an indicating needle and a counting device or odometer in combination.

It is therefore an object of our invention to provide an electric synchronous remote drive.

It is a further object to provide such an electric drive which will be powerful enough to drive substantially any indicating device desired.

It is a still further object to provide a device which will reproduce at a distant point any rotary motion at the proximate end of the device.

With these and other objects in view the embodiments of our invention are set forth in the following specification and claims and illustrated in the accompanying drawings, in which:

Figure 1:
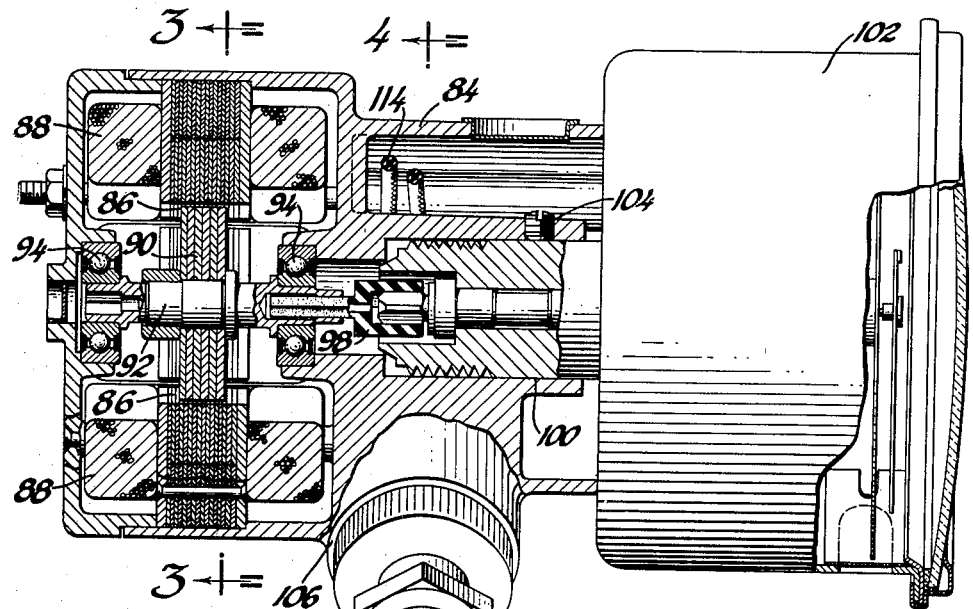
Figure 1 is a side elevation of the drive motor and indicating instrument assembly, parts being broken away and shown in section.

Figures 3 and 4 are sectional views taken respectively on lines 3—3 and 4—4 of Figure 1.

Figure 2:
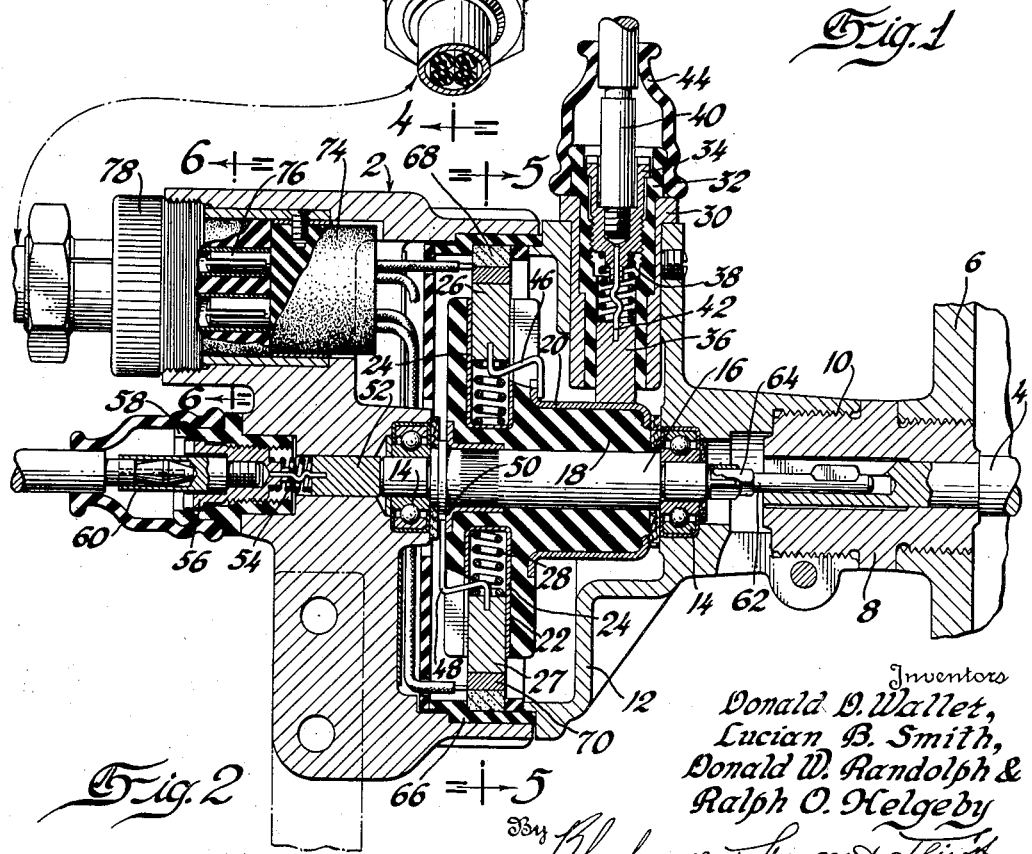
Figure 2 is a vertical section through the converter which is a power driven unit or device.

Figures 5 and 6 are sectional views taken respectively on lines 5—5 and 6—6 of Figure 2.

Our invention, broadly stated, consists of a small converter for converting or setting up a rotating field and a motor supplied by fluctuating current from the generator, said motor thereby revolving synchronously therewith. The motor is adapted to drive any desired indicating apparatus such as a conventional speedometer and odometer combination. This device is described and illustrated as being one applied to speedometers which are normally, of course, operated with automotive vehicles but it is not desired to limit it to any such construction inasmuch as it may be used in the conversion of synchronous motion from any rotating means and the operation of any type of indicating device at a remote point therefrom.

The converter, designated generally at 2 and best shown in Figure 2, can also be termed the driven member, driven from any suitable source of rotating mechanism available and in the present case may be attached to be driven by either the transmission drive, cam shaft or the rotating shaft of the distributor or some shaft driven from either of these two, said shaft being generally designated at 4.

A housing 6 has therein a suitable opening in which is screw-threaded a bushing 8, said bushing surrounding the outer end of the shaft 4 and supporting the shaft within the housing. The other end of the bushing 8 is also threaded externally, as shown at 10, and secured thereon by threading the same thereover is one portion of the converter housing 12. The converter housing is also secured by any suitable means, such as shown in the lower left-hand portion of Figure 2, to any other support within the location of the apparatus.

Within the housing 12 are supported two aligned sets of ball bearings 14 which support a rotating shaft 16 having thereon a circular disk 18 of insulating material, the two axially extending portions of which are of two different diameters, the rearmost portion being of small diameter and having secured over the outer periphery thereof a conducting cylinder or shield 20 and the forward portion, or portion having the largest diameter, having therein two diametrically opposed openings 22 within which are contained cup-shaped members 24. Within the cups are adapted to slide two conducting brushes 26 and 27. Between the lowermost ends of the brushes and the bottom of the cups 24 there is contained a helical spring 28 which tends to eject the brushes from the cups.

In the portion of the casing adjacent the surface of the sleeve or cylinder 20 there is provided an opening within which a cylindrical member 30 projects and fitting closely within the interior of the cylindrical member is an insulating sleeve 32, the inner central surface of the latter being threaded to hold a plug 34. Within the lower end of the insulating sleeve 32 is carried a carbon or similar conducting brush 36, said brush being biased to expelled position from the sleeve 32 by a coil spring 38 which is pressed against the inward face of the brush by the plug 34 which may be screwed in to keep any desired tension on the spring 38.

Also carried by the plug is a contact member 40 which is electrically connected to the carbon brush by a flexible lead 42. A suitable snap-on water tight protector cap, as shown at 44, is slipped over the contact to prevent water or dirt from getting into the same and causing wear and short-circuiting. It is thus seen that any current supplied by the cable connected to the contact 40 is carried through to the carbon brush 36 and is thus applied to the conducting sleeve 20 of the rotating member. The member 20 is electrically connected to brush 26 by connector 46 and brush 27 is connected through connector 48 to a metallic sleeve 50 on the shaft 16.

The end of the shaft 16, carried in the ball bearing to the left in Figure 2, has forced thereagainst a further carbon brush 52 by a helical spring 54, the tension upon which is varied by varying the position of the plug 56 within an insulating sleeve 58 which is forced into an enlarged opening in alignment with the end of the shaft. The plug 56 also carries a contact member 60 into which a cable may be inserted to conduct the electricity flowing therefrom to ground. The shaft 4 is axially bored at its end to provide for the insertion of the reduced end of the connector shaft 62, the opposite end of which fits within a squared opening in the end of the shaft 16 as shown at 64. This gives a mechanical drive between shafts 4 and 16.

Carried by the casing 12 around the periphery of the rotating member, and particularly adjacent the path of the rotating brushes 26 and 27, there is inserted a ring 66 of insulating material which carries concentrically within it a second ring 68 of a combination of resin bonded graphite which acts as a conductor. Cast within the inner ring are a series of copper segments 70, the latter being the innermost and adapted to contact the carbon brushes 26 and 27 if the latter rotate within the circle, the whole acting as a commutator.

Directly connected to the conducting combination of copper and resin bonded graphite at four points spaced 90° apart about the periphery are a series of cables shown at 72. These cables are all carried up to a connection block 74 of insulating material which carries a series of connector prongs 76 extending therefrom. A mating plug 78 is adapted to mate with these projectors, said plug being connected to one end of a cable carrying four separate and insulated wires to conduct the current over these different lines to a remote point. As will be noted, especially from Figure 6, the projecting prongs and sleeve connectors therefor are different sizes, such as shown at 80 and 82, so that the plug can only be applied in one position and therefore the current will always flow over the same set of wires in the same relationship.

The opposite end of the cable conducts current to what might be termed the driving motor and indicating mechanism, said combination being shown in one assembly in group 1 and consisting mainly in a casing 84 within one end of which is a motor which consists of a series of field poles 86 around which are wound coils 88. There are four poles, the coil around each one of the poles being energized by one of the wires carried through the cable. Within the central portion between the poles there is rotatably supported a permanent magnet rotor 90 whose shaft 92 is carried in two sets of ball bearings 94 which are carried in the housing.

The inner end of the rotor shaft is drilled to provide an opening for one end of an adaptor 98 which is of squared cross section and will turn with the motor shaft.

The housing at the opposite end of the motor provides a substantially circular opening 100 within which the supporting shaft for a conventional speedometer and odometer combination 102 is adapted to project and is held therein by any suitable set screw such as 104. The rear end of the drive shaft for the speedometer is adapted to fit within an opening in the adaptor 98 and is therefore driven thereby. The housing also provides a connecting block 106 which is similar to that shown at 74, 76 and 78 for connecting the four cables to the motor.

We claim:

1. In indicating mechanism, a casing, a shaft rotatably supported in the casing, a rotor formed of insulating material carried by the shaft, a plurality of circumferentially spaced radial cups in the rotor, brushes slidably mounted in the cups, spring means to bias the brushes outwardly from the cups, a conducting cylinder shrouding a portion of the rotor axially spaced from the brushes, a resistance ring carried by the casing in axial alignment with the brushes and over which they are adapted to pass, a further brush carried by the case and adapted to engage the cylindrical conductor and means connecting the cylindrical conductor to one of the brushes and another brush to ground whereby current may be introduced to the brushes and through them to the resistance stator.

2. In indicating mechanism, a casing, a shaft rotatably supported in the casing, a rotor formed of insulating material carried by the shaft, a plurality of circumferentially spaced radial cups in the rotor, brushes slidably mounted in the cups, spring means to bias the brushes outwardly from the cups, a conducting cylinder shrouding a portion of the rotor axially spaced from the brushes, a resistance ring carried by the casing in axial alignment with the brushes and over which they are adapted to pass, a further brush carried by the case and adapted to engage the cylindrical conductor, means connecting the cylindrical conductor to one of the brushes and another brush to ground and a plurality of spaced conductors staked into the resistance ring whereby current may be introduced to the brushes and stator and produce pulsating timed current in the conductors upon rotation of the shaft.

DONALD D. WALLER.
LUCIAN B. SMITH.
DONALD W. RANDOLPH.
RALPH O. HELGEBY.